United States Patent
Morrison

(10) Patent No.: US 6,698,380 B2
(45) Date of Patent: Mar. 2, 2004

(54) ANIMAL BED FROM COTTONSEED

(76) Inventor: Daniel C. Morrison, 62 Caramel Dr., Little Rock, AK (US) 72212

( * ) Notice: Subject to any disclaimer, the term of this patent is extended or adjusted under 35 U.S.C. 154(b) by 0 days.

(21) Appl. No.: 10/353,204

(22) Filed: Jan. 28, 2003

(65) Prior Publication Data

US 2003/0140862 A1 Jul. 31, 2003

Related U.S. Application Data

(60) Provisional application No. 60/353,044, filed on Jan. 30, 2002.

(51) Int. Cl.⁷ .............................................. A01K 29/00
(52) U.S. Cl. ..................................................... 119/28.5
(58) Field of Search ................................. 119/28.5, 174

(56) References Cited

U.S. PATENT DOCUMENTS

| | | | | |
|---|---|---|---|---|
| 4,351,849 A | * | 9/1982 | Meade | 426/61 |
| 4,827,871 A | * | 5/1989 | Morrison | 119/171 |
| 4,963,366 A | * | 10/1990 | Thomas | 424/601 |
| 5,091,245 A | | 2/1992 | Phillips | 428/221 |
| 5,188,064 A | * | 2/1993 | House | 119/172 |
| 5,352,780 A | | 10/1994 | Webb et al. | 536/56 |
| 5,358,607 A | | 10/1994 | Ellis | 162/100 |
| 5,643,582 A | * | 7/1997 | Gangadharan et al. | 424/401 |
| 5,961,823 A | * | 10/1999 | Alper | 210/198.1 |
| 5,964,187 A | | 10/1999 | Willis | 119/171 |
| 6,039,004 A | * | 3/2000 | Goss et al. | 119/172 |
| 6,089,190 A | * | 7/2000 | Jaffee et al. | 119/173 |
| 6,276,619 B1 | | 8/2001 | Turk et al. | 241/21 |
| 6,495,151 B2 | * | 12/2002 | McAtee et al. | 424/402 |
| 6,547,063 B1 | * | 4/2003 | Zaveri et al. | 206/190 |

* cited by examiner

*Primary Examiner*—Thomas Price
(74) *Attorney, Agent, or Firm*—Armstrong, Kratz, Quintos, Hanson & Brooks, LLP

(57) ABSTRACT

A method for improving the comfort, health, and grooming of an animal by providing a bedding material made of cottonseeds. A fragrance and/or a pesticide may be added to the cottonseeds.

8 Claims, 2 Drawing Sheets

ANIMAL BED FROM COTTONSEED

CROSS-REFERENCE TO RELATED APPLICATIONS

This application is related to Provisional Patent Application Serial No. 60/353,044, filed Jan. 30, 2002.

BACKGROUND OF THE INVENTION

1. Field of the Invention

The present invention relates to a method for improving the health of an animal by providing a bedding material that is not dry and dusty and that provides insulating warmth, and in particular, to such a bedding material derived from cottonseeds.

2. Description of Related Art

Various bedding materials for animals, particularly domestic animals such as dogs, are known in the prior art. These bedding materials often comprise, at least in part, substances that are not derived from natural sources. Some of the most popular bedding materials that are derived from natural sources include cedar shavings. Cedar shavings contribute to dry skin problems in some animals and the dust may also contribute to lung problems from the animal breathing in the dust.

It is desirable that animal bedding material provide insulating warmth to help the animal stay warmer in winter and cooler in summer.

The applicant is aware of the following U.S. patents which disclose material used for animal bedding:

| U.S. Pat. No. | Inventor(s) |
| --- | --- |
| 5,352,780 | Webb et al |
| 5,964,187 | Willis |
| 6,089,190 | Jaffee et al |
| 6,276,619 | Turk et al |

All of these patents use cellulose-based products to form the bedding. The comfort of the animal and the improved appearance of the animal's coat are not adequately provided in these materials.

BRIEF SUMMARY OF THE INVENTION

A method of providing for the warmth, comfort and grooming of a fur-bearing pet or animal.

In accordance with the teachings of the present invention, there is disclosed a method of providing warmth and comfort for a dog or other pet or animal while it is sleeping or otherwise resting, and simultaneously grooming the dog or other pet or animal. A suitable enclosure is provided substantially constituting a bed for the dog or other pet or animal, and cottonseed is placed within the bed, thereby keeping the dog or other pet or animal insulated and very warm and comfortable. The bed will conform to the dog or other pet or animal and yet allow it to move around. As the dog or other pet or animal lays in the bed or occasionally moves around, its fur or skin will come into contact with the cottonseed, such that oil from the cottonseed will rub off onto the dog or other pet or animal, thereby cleaning its fur or skin and substantially improving the appearance of the coat of the dog or other pet or animal. A fragrance and a relatively low dosage of an insecticide are added to the cottonseed.

In further accordance with the teachings of the present invention, there is disclosed a bedding material for animals and pets formed from cottonseeds.

These and other objects of the present invention will become apparent from a reading of the following specification taken in conjunction with the enclosed drawings.

DESCRIPTION OF THE PREFERRED EMBODIMENTS

Figure 1:
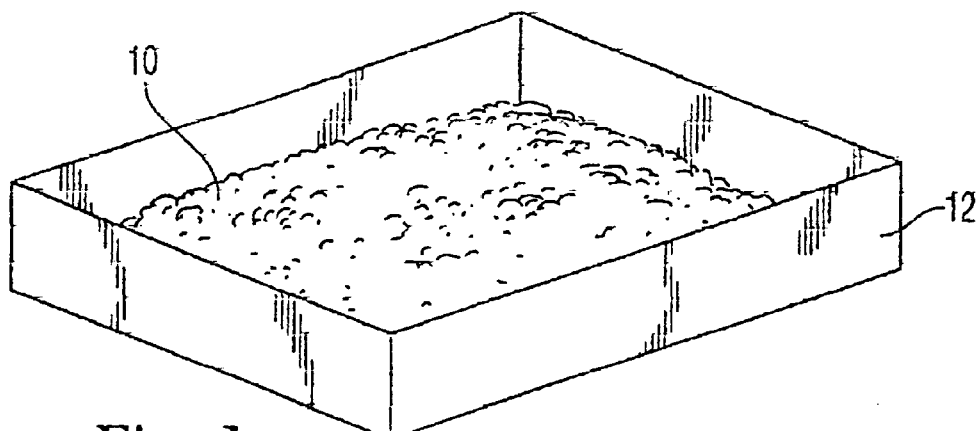
FIG. 1 is a perspective view of an open top tray containing cottonseeds.
Figure 2:
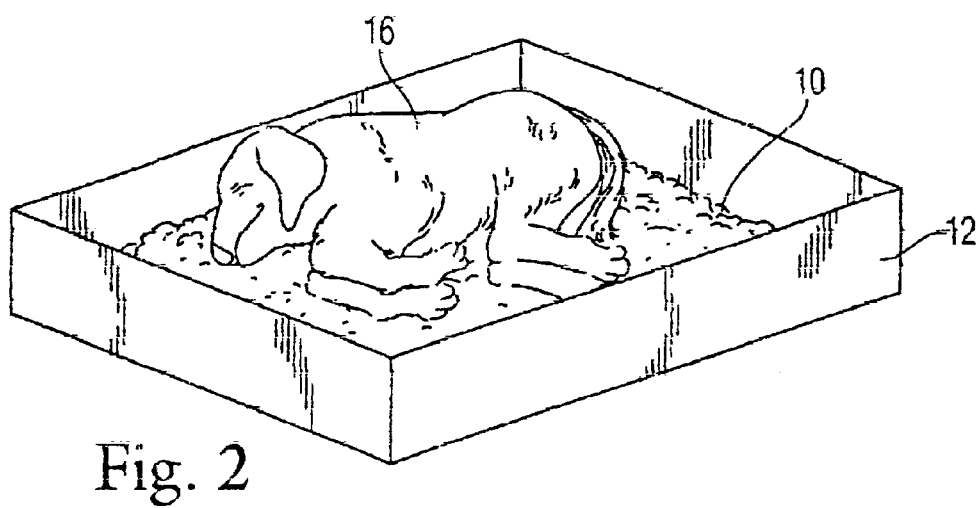
FIG. 2 is a perspective view of a dog lying on the cottonseeds in the tray.
Figure 3:
FIG. 3 is a perspective view of a plurality of cottonseeds.
Figure 4:
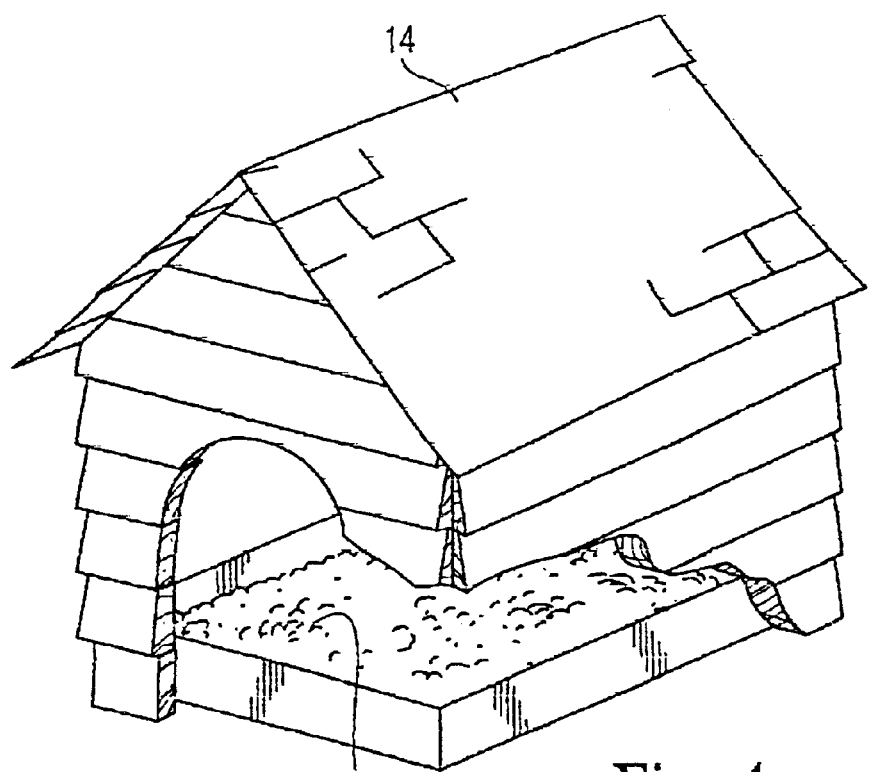
FIG. 4 is a partial cutaway perspective view of a dog house having cottonseeds disposed on the floor of the dog house.

In accordance with the present invention, it has been discovered that natural cottonseed, a by-product of the cotton production industry, is an ideal bedding material for dogs, cats and other small animals. As shown in FIGS. 1, 2 and 4, the animal bedding material of the present invention is 100% fuzzy cottonseed 10 (FIG. 3). The natural cotton fibers which cover the seed (linters) provide superior insulating properties to provide warmth for the animal in the winter and cooling in the summer. The natural vegetable oil content promotes a smooth and shiny coat and avoids the problem of dry skin caused by some prior art bedding materials. Cedar shavings, for example, are known to be dry and dusty and can contribute to skin problems in some animals and may also cause lung problems from breathing the dust. Cottonseed bedding material avoids these health problems.

Figure 5:
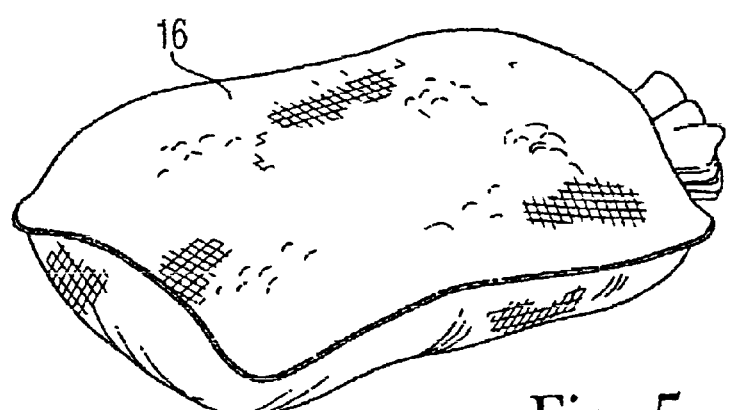
FIG. 5 is a perspective view of a bag containing cottonseeds.

The preferred embodiment of the method of the present invention is described as follows. Start with a clean and dry open tray 12 or dog house 14. Place cottonseed approximately 2–4 inches deep inside the tray 12 or dog house 14. Some dogs may accidentally kick some of the bedding out of the house. This may be prevented by raising the level of the door 2–3 inches with a board or piece of plastic pipe. Notch each end of the board or pipe to fit in the door. The dog or pet 16 lies on the layer of cottonseed 10 and may burrow in to be more comfortable. The layer of cottonseed conform to the shape of each individual animal. The cottonseed 10 may be contained in a bag 18 formed from a close mesh material as shown in FIG. 5. With this form of the bed, the animal rests on top of the bag. In this type of bed, it is very easy to move the bed to a different location. The package avoids the possibility of the individual cottonseeds being distributed in areas which are, preferably, kept free of cottonseeds. Cottonseed is used as a feed for cattle and can be safely ingested.

Generally, the cottonseed will provide warmth and comfort for at least 90 days. The cottonseed may be replaced as needed with clean cottonseed.

Natural cottonseed is hypoallergenic and biodegradable. The used bedding materials may be disposed of by mixing and incorporating the used bedding material in plant beds. The used bedding material may also be composted. Also, the used bedding material may be mixed with topsoil in the ratio of one part used cottonseed bedding with three parts topsoil for an excellent potting soil.

The cottonseed may be treated with a fragrance to provide an aroma which is pleasant for humans and animals and which also may mask unwanted animal odors.

One such fragrance is obtained by adding finely chopped spearmint and/or peppermint leaves to the cottonseeds. Finely chopping the leaves produces a greater surface area and releases the oil content of the leaves. Thus, a mix of mint oil and cottonseed oil is available. Mint leaves could be added to be approximately 0.1–5% by weight. When the cottonseeds are packaged in the mesh bag, a slightly higher concentration of fragrance is preferred. The present invention is not limited to mint as the fragrance. Any fragrance known to persons skilled in the art may be used.

Also, small amounts of pesticide or insecticide may be added to the bulk cottonseed to eliminate animal pests. In particular, pesticides to kill fleas and ticks are preferred. The type of pesticide and the concentration is a function of the effectiveness of the pesticide against the target insect and the safety of pesticide with respect to the particular animal or pet. Insecticides such as carbaryl, malathion, permethrin and rabon are examples of insecticides which have been approved for use with dogs. A rate of application ranging from approximately 0.0001 to 100 ppm may be used. The present invention is not limited to the insecticides or concentration disclosed herein. The animal or pet is exposed to a controlled concentration of insecticide which provides a sustainable pest free environment.

The present invention has been described with reference to certain preferred and alternative embodiments that are intended to be exemplary only and not limiting to the full scope of the present invention as set forth in the appended claims.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. The method of providing warmth and comfort for a dog or other pet or animal while it is sleeping or otherwise resting, and simultaneously grooming the dog or other pet or animal, comprising the steps of providing a suitable enclosure substantially constituting a bed for the dog or other pet or animal, and placing cottonseed within the bed, thereby keeping the dog or other pet or animal insulated and very warm and comfortable; such that the bed will conform to the dog or other pet or animal and yet allow it to move around; and such that as the dog or other pet or animal lays in the bed or occasionally moves around, its fur or skin will come into contact with the cottonseed, such that oil from the cottonseed will rub off onto the dog or other pet or animal, thereby cleaning its fur or skin and substantially improving the appearance of the coat of the dog or other pet or animal.

2. The method of claim 1, further including the step of putting a fragrance into the cottonseed.

3. The method of claim 1, further including the step of putting an insecticide in the cottonseed.

4. The method of claim 3, wherein the insecticide is in a relatively low dosage and is especially intended for ticks and/or fleas.

5. A dog bed made in accordance with claim 1.

6. The method of claim 1, wherein the suitable enclosure is a bag formed from a mesh material.

7. The method of providing warmth and comfort for a dog or other pet or animal while it is sleeping or otherwise resting, and simultaneously grooming the dog or other pet or animal, comprising the steps of providing a suitable enclosure substantially constituting a bed for the dog or other pet or animal, and placing cottonseed within the bed, thereby keeping the dog or other pet or animal insulated and very warm and comfortable; such that the bed will conform to the dog or other pet or animal and yet allow it to move around; and such that as the dog or other pet or animal lays in the bed or occasionally moves around, its fur or skin will come into contact with the cottonseed, such that oil from the cottonseed will rub off onto the dog or other pet or animal, thereby cleaning its fur or skin and substantially improving the appearance of the coat of the dog or other pet or animal, and adding to the cottonseed a fragrance and a relatively low dosage of an insecticide.

8. A dog bed made in accordance with claim 7.

* * * * *